United States Patent [19]
LaMoreux

[11] 3,808,695
[45] May 7, 1974

[54] TESTING AND MEASURING APPARATUS FOR VEHICLE WHEEL FRONT END ASSEMBLY

[75] Inventor: Clarence E. LaMoreux, Winter Haven, Fla.

[73] Assignee: Associated International Corporation, Winter Haven, Fla.

[22] Filed: July 28, 1972

[21] Appl. No.: 276,176

Related U.S. Application Data

[63] Continuation-in-part of Ser. No. 85,325, Oct. 30, 1970, Pat. No. 3,736,665.

[52] U.S. Cl............... 33/169 R, 33/174 Q, 33/203, 33/203.16
[51] Int. Cl......................... G01b 5/24, G01b 3/22
[58] Field of Search .......... 33/169 R, 172 R, 174 L, 33/174 Q, 203.15, 203.16, 203.18, 203.19

[56] References Cited
UNITED STATES PATENTS
3,581,403  6/1971  Tuttle ............................ 33/203.16
3,242,579  3/1966  Cermenaro et al. .............. 33/169 R
3,181,245  5/1965  Bullinger..................... 33/203.15 X
1,565,920  12/1925  Flick................................ 33/203.19
3,736,665  6/1973  LaMoreux ....................... 33/203.16

Primary Examiner—William D. Martin, Jr.
Attorney, Agent, or Firm—Zalkind, Horne & Shuster

[57] ABSTRACT

Axial and radial play of ball joints in front end wheel assemblies of vehicles, are measured by a testing device from which a pair of wheel engaging elements project. A handle connected to one of the wheel engaging elements is actuated to bring that element into engagement with the wheel while retracting the other wheel engaging element in order to select the measurement to be made. Movement of either wheel engaging element is registered by an indicator on an adjustably positioned dial.

15 Claims, 8 Drawing Figures

PATENTED MAY 7 1974    3,808,695

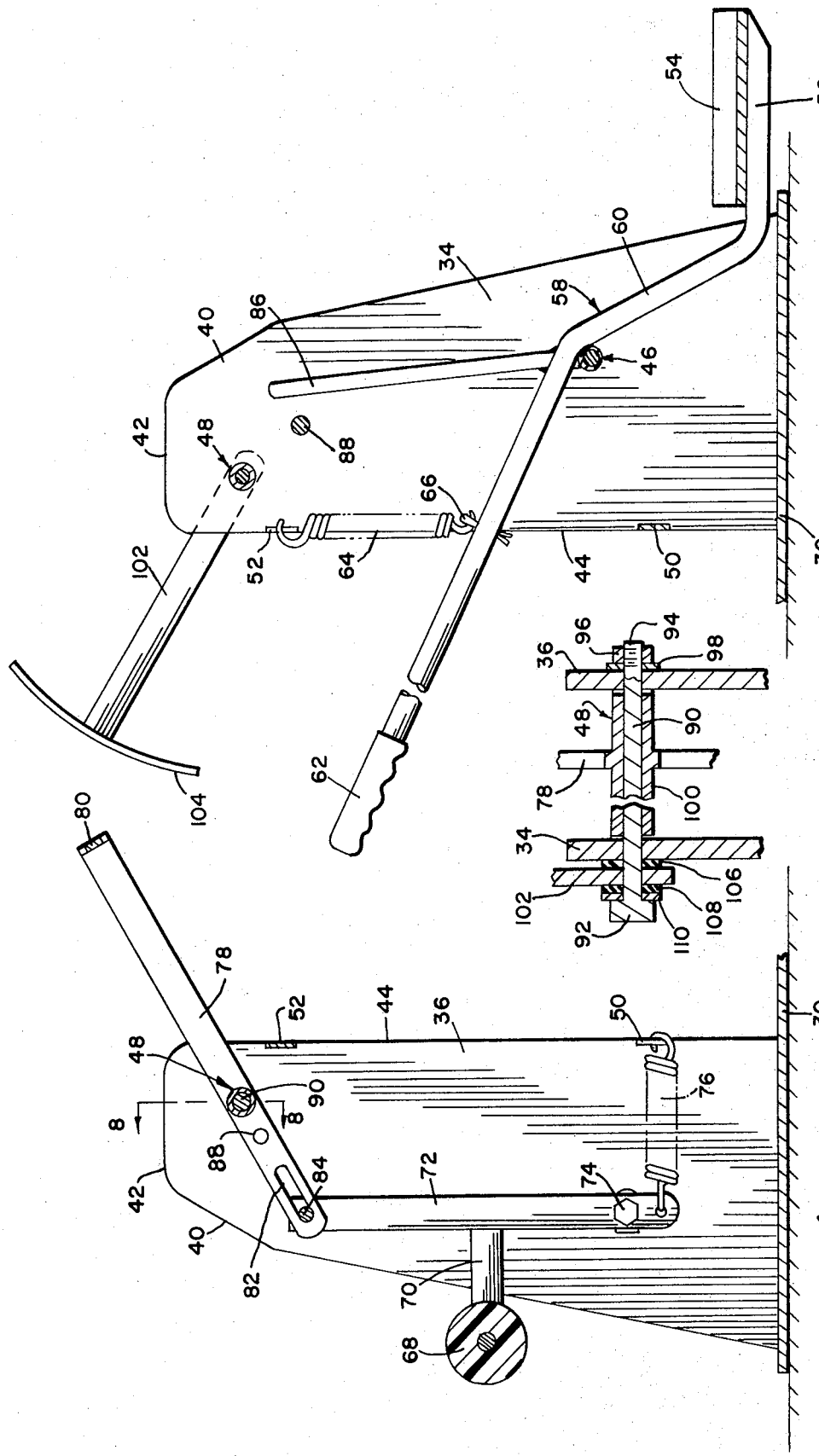

TESTING AND MEASURING APPARATUS FOR VEHICLE WHEEL FRONT END ASSEMBLY

This application is a continuation-in-part of my prior copending application U.S. Ser. No. 85,325, filed Oct. 30, 1970, now U.S. Pat. No. 3,736,665.

This invention relates to the testing of joints in automotive vehicles as well as the out-of-roundness of vehicle tires to determine whether repair or replacement is necessary.

The testing apparatus of the present invention like that disclosed in my prior co-pending application, is capable of registering different measurements without requiring the rearrangement of parts of the testing apparatus. Testing of front end wheel assemblies may thereby be effected more rapidly, accurately and in a more facile manner than heretofore possible. Further, the testing apparatus of the present invention involves important improvements over the apparatus disclosed in my prior co-pending application aforementioned, because of a reduction in the number of parts, a more rugged construction and greater measuring accuracy.

In accordance with the present invention, the forward edge of a support frame associated with the testing apparatus is positioned adjacent to the vehicle wheel so that either one of two wheel engaging elements may be placed in contact with the tire when elevated. The lowermost wheel engaging element is connected to the end of the lever fulcrummed within the support frame, a handle being connected to the other end of this lever and projecting rearwardly from the support frame. A lost motion transmitter connected to the handle actuated lever is engagable with an indicator to register motion. A second lever carrying the other wheel engaging element is vertically spaced above the first mentioned wheel engaging element. This, when the handle actuated lever is manually displaced to bring the lowermost wheel engaging element into contact with the tire for sensing motion, the other wheel engaging element is retracted. Movement sensed by the upper wheel engaging element is transmitted from one end of the second lever through a pin and slot connected to the indicator which is pivotedly mounted on the support frame. The pointer end of the indicator registers movement on a dial member that is angularly adjustable to a zero setting position. Spring means connected to the levers bias the upper wheel engaging element to an extended position while holding the lost motion transmitter disengaged.

In the drawings,

FIG. 6 is an enlarged side sectional view taken substantially through a plane indicated by section line indicated 6—6 in FIG. 4.

FIG. 7 is an enlarged side sectional view taken substantially through a plane indicated by section line 7—7 in FIG. 4.

FIG. 8 is an enlarged partial sectional view taken substantially through a plane indicated by section line 8—8 in FIG. 6.

Figure 1:
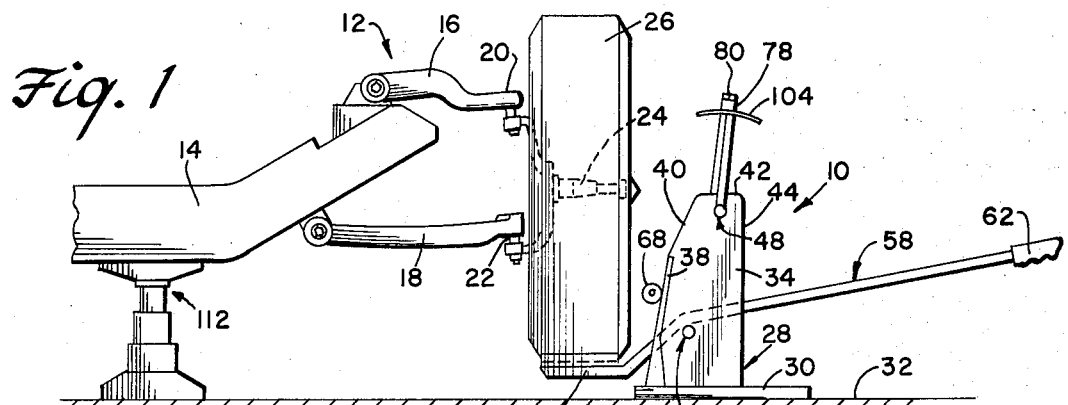
FIG. 1 is a side elevational view showing the testing apparatus of the present invention being used in one typical installation for measuring axial play in a front end wheel assembly.
Figure 2:
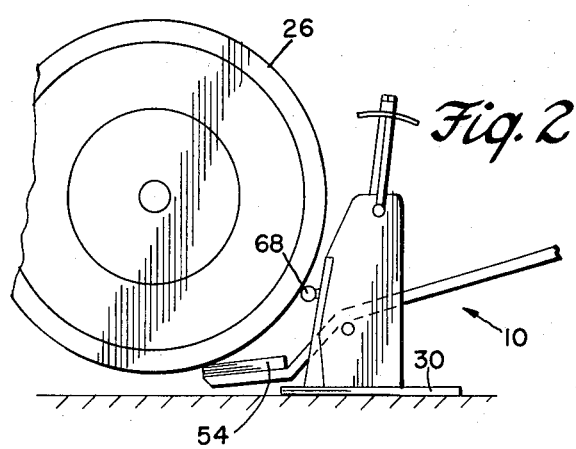
FIG. 2 is a partial side elevational view showing the testing apparatus in another operational mode for measuring out-of-roundness of a vehicle tire.
Figure 3:
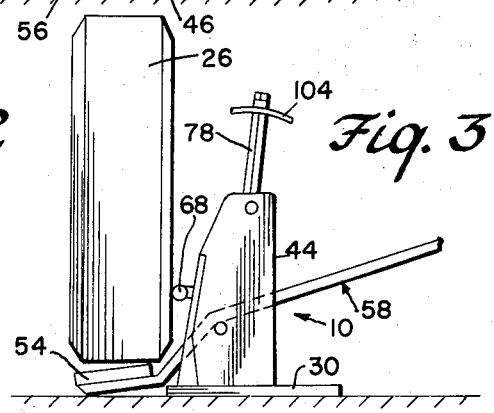
FIG. 3 is a side elevational view showing the testing apparatus in a third operational mode for measuring radial ball joint play.

Referring now to the drawings in detail, FIGS. 1, 2 and 3 show the testing apparatus of the present invention generally denoted by reference numeral 10 in three different operational modes. In FIG. 1, the testing apparatus 10 is shown in position relative to a typical front end wheel assembly 12 of a vehicle. It should, however, be appreciated that the testing apparatus is capable of being utilized for different types of front end wheel assemblies, the arrangement shown in FIG. 1 being merely one example in which the vehicle frame 14 pivotally mounts upper and lower support arms 16 and 18 carrying upper and lower ball joints 20 and 22 to which the wheel spindle 24 is connected. The wheel assembly including the tire 26 is mounted on the spindle 24 and is adapted to be engaged by the testing apparatus 10 in different operational modes as will be explained in detail hereafter.

Figure 4:
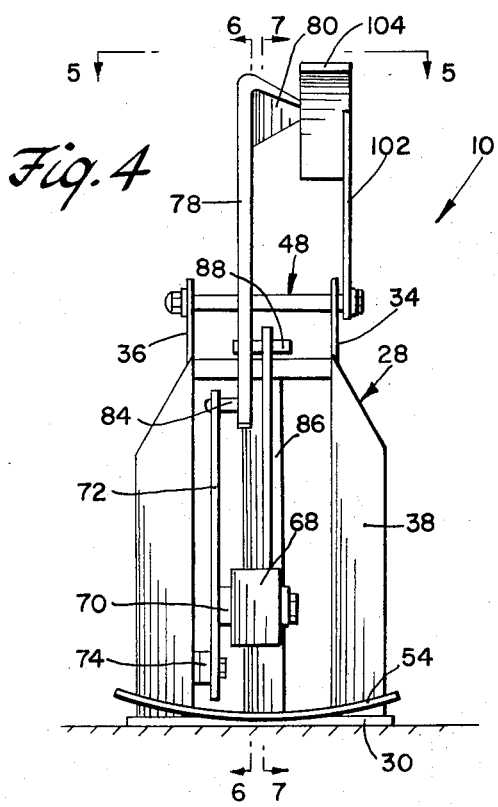
FIG. 4 is a front elevational view of the testing apparatus.
Figure 5:
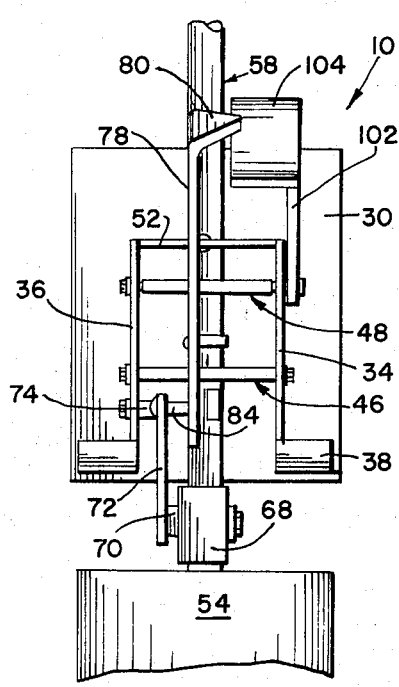
FIG. 5 is a partial top plan view of the apparatus as seen from a plane indicated by section line 5—5 in FIG. 4.

Referring now to FIGS. 1, 4, and 5, the apparatus 10 includes a support frame generally referred to by reference numeral 28. The support frame in the illustrated embodiment comprises a base plate 30 adapted to rest on a level surface 32 from which a pair of vertical plate members 34 and 36 extend upwardly in spaced relationship to each other. The plate members are provided with laterally extending flanges 38 along the forward edges which are inclined rearwardly by a slight amount. The forward edges slope rearwardly along sections 40 to a top edge 42 interconnecting the forward edges with rear edges 44. The vertical plate members 34 and 36 are, of course, fixedly spaced by their connections to the base plate 30 and by pivot shaft assemblies 46 and 48 that are vertically spaced between the base plate 30 and the upper edges 42 of the plate members. Also, the vertical plate members are interconnected at the rear edges 44 by lower and upper cross bars 50 and 52 as more clearly seen in FIGS. 6 and 7.

Mounted by the support frame between the vertical plate members, are a pair of motion detecting devices each of which includes a wheel engaging element. The lowermost wheel engaging element is in the form of a transversely curved foot plate 54. The element 54 is secured as by welding to the end section 56 of a lever 58 that is pivotedly mounted by the pivot shaft assembly 46 on the support frame. The end section 56 of the lever is connected to a portion 60 that extends downwardly from the pivot shaft assembly 46 as more clearly seen in FIG. 7. The other end of the lever 58 is provided with a handle 62 spaced rearwardly from the rear edges 44 of the support frame from which the lever 58 extends at an upward incline. The lever 58 is biased in a clockwise direction as viewed in FIG. 7 by a spring 64, the opposite ends of which are connected to the lever by a cotter pin 66 and to the upper cross bar 52.

The second motion detecting device associated with the testing apparatus includes a roller 68 that is rotatably mounted on the end of an arm 70. Projecting forwardly from the flanges 38 between the vertical plate members 34 and 36, the arm 70 is secured to and extends at a right angle from a second lever 72 that is fulcrummed on the support frame by a fulcrum assembly 74 secured to the plate member 36. The lower end of the lever 72 below the fulcrum assembly 74, as more clearly seen in FIG. 6, is connected to one end of a spring 76, the other end of which is anchored to the cross bar 50. The spring 76 is thereby operative to bias the lever 72 in a counter clockwise direction as viewed in FIG. 6 thereby urging the roller 68 to an extended position.

Also pivotedly mounted between the vertical plate members of the support frame is an indicator lever 78. The indicator 78 is pivotedly mounted by the upper pivot shaft assembly 48 and is provided at its upper end with a pointer 80. The lower end portion of the indicator is provided with a slot 82 guidingly receiving a pin 84 that extends laterally from one side of lever 72 at its upper end. Accordingly, any pivotal motion imparted to the lever 72 through roller 68, will be transmitted by the continuous pin and slot linkage connection to the indicator 78.

With respect to the lever 58, movement is transmitted to the indicator 78 by a lost motion connection which includes a torque arm 86 secured to the lever as by welding, extending upwardly therefrom adjacent to the pivot shaft assembly 46 as more clearly seen in FIG. 7. The torque arm 86 is adapted to engage a pin 88 that extends laterally from the indicator 78, after the lever 58 has been displaced counter clockwise by a predetermined amount against the bias of spring 64 as seen in FIG 7. Once engaged with pin 88, any movement of the lever 58 will be transmitted to the indicator 78. It will also be apparent, that when pin 88 is engaged during a predetermined range of movement of lever 58, the pin and slot connection to lever 72 will maintain the wheel engaging roller 68 in a relatively retracted position.

Except for certain additional functional features, the shaft assembly 48 is similar to that of the lower pivot shaft assembly 46 in that it includes an elongated bolt 90 having a head at one end and an opposite threaded end portion 94. The bolt is held assembled by a nut 96 on the threaded end abutting a washer 98 against the plate member 36 as shown in FIG. 8. A sleeve 100 is rotatably mounted on the bolt 90 between the plate members and carries the indicator 78 thereon in the case of assembly 48. Also, rotatably mounted on the bolt on the outside of the plate 34 is a support arm 102. Secured to the upper end of the support arm above the support frame, is an arcuate dial plate 104 which closely underlies the pointer 80 when the support arm 102 is angularly positioned relative to the indicator. The support arm is releasably held in its adjusted angular position by a pair of friction washers 106 and 108 disposed on opposite axial sides thereof and sandwiched between the plate member 34 and a rigid washer 110 abutting the head 92 of the pivot bolt as shown in FIG. 8.

From the foregoing description, operation and use of the testing apparatus will become apparent. In the axial play measuring mode illustrated in FIG. 1, the support frame 28 of the testing apparatus is positioned in alignment with spindle 24 and the vehicle frame at the front end assembly 12 is elevated by a jack 112 in order to permit the foot plate 54 to be inserted under the tire 26. The handle 62 is then actuated downwardly to bring the foot plate 54 into engagement with the tire in order to take up axial play in the ball joints, if any. This displacement of the foot element 54 will at the same time retract the roller element 68 as hereinbefore described. The dial 104 may then be angularly adjusted to a zero position relative to pointer 80 at the upper end of indicator 78. When the lever 58 is then released, any counter clockwise motion imparted to lever 58 as a result of axial play in the ball joints 20 and 22 will be registered by the indicator along the dial 104. This motion is transmitted through the torque arm 86 and pin 88 as hereinbefore described.

In order to measure radial play in the ball joints the lever 58 is released so that the foot element 54 is displaced out of engagement with the tire under the bias of spring 64 while the roller element 68 is displaced into contact with the tire as shown in FIG 3. In this operational mode, any motion imparted to lever 58 will not be transmitted to the indicator because the torque arm 86 is disengaged or spaced from the pin 88 projecting from the indicator. Movement imparted to lever 72 on the other hand will be transmitted to the indicator. Such movement is produced if there is any radial play by manually rocking the tire 26 laterally. Since roller element 68 is in contact with the tire, the rocking motion will be transmitted to the indicator through lever 72. The amount of rocking motion will, of course, depend upon the radial play in the ball joints and may be registered on the dial 104 after it is angularly adjusted to a zero position prior to manually rocking the tire.

The same operational mode for the testing apparatus as described with respect to FIG. 3 will provide measurement of the out-of-roundness of the tire when the apparatus 10 is repositioned relative to the tire as shown in FIG. 2. The roller element 68 then contacts the circumferential rim of the tire which is then rotated.

It will be apparent that the testing apparatus can be rapidly calibrated by angular adjustment of the dial member prior to obtaining any of the different measurements hereinbefore described and that a comparison of such measurements with charted data will enable one to determine whether repair or replacement is required because of wear in the joints of the front end wheel assembly.

I claim:

1. Testing and measuring apparatus comprising a support frame, a pair of motion detecting devices movably mounted by the support frame, each of said devices including a wheel engaging element, indicating means movably mounted on the support frame for registering movement sensed by each of said devices, linkage means continuously interconnecting the indicating means with one of the motion detecting devices, lost motion transmitting means connected to the other of the motion detecting devices for engagement with the indicating means, biasing means connected to said motion detecting devices for urging the lost motion transmitting means to a disengaged position, and handle means connected to the other of the motion detecting devices for displacing the same against said urge of the biasing means.

2. The combination of claim 1, including a dial member movably mounted on the support frame in operative relation to the indicating means, and means for releasably holding the dial member in an adjusted position relative to the indicating means.

3. The combination of claim 2, wherein said linkage means comprises a pin and slot connection.

4. The combination of claim 3, wherein said lost motion transmitting means comprises a torque arm secured to said other of the motion detecting devices and a pin projecting from the indicating means into the path of the torque arm.

5. The combination of claim 4, wherein each of said motion detecting devices further includes a lever pivotally mounted on the support frame, one of the levers being connected to the biasing means and the linkage means at opposite ends thereof, the other of the levers being connected to the other of the wheel engaging elements and the handle means at opposite ends thereof.

6. The combination of claim 5, wherein the indicating means includes a pivot shaft secured to the support frame, a sleeve rotatably mounted on the pivot shaft and a pointer arm secured to the sleeve, said dial member being adjustably mounted on the pivot shaft in axially spaced relation to the pointer arm.

7. The combination of claim 2, wherein the indicating means includes a pivot shaft secured to the support frame, a sleeve rotatably mounted on the pivot shaft and a pointer arm secured to the sleeve, said dial member being adjustably mounted on the pivot shaft in axially spaced relation to the pointer arm.

8. The combination of claim 1, wherein each of said motion detecting devices further includes a lever pivotally mounted on the support frame, one of the levers being connected to the biasing means and the linkage means at opposite ends thereof, the other of the levers being connected to the other of the wheel engaging elements and the handle means.

9. The combination of claim 1, wherein said linkage means comprises a pin and slot connection.

10. The combination of claim 1, wherein said lost motion transmitting means comprises a torque arm secured to said other of the motion detecting devices and a pin projecting from the indicating means into the path of the torque arm.

11. The combination of claim 1, wherein said support frame comprises a pair of spaced vertical plate members having forward flanges from which the wheel engaging elements project in vertically spaced relation to each other, and a base plate to which said vertical plate members are secured.

12. The combination of claim 11, wherein each of said motion detecting devices further includes a lever pivotally mounted on the support frame, one of the levers being connected to the biasing means and the linkage means at opposite ends thereof, the other of the levers being connected to the other of the wheel engaging elements and the handle means at opposite ends thereof.

13. The combination of claim 12, wherein the other of the levers extends rearwardly from the support frame.

14. The combination of claim 13, wherein one of the wheel engaging elements includes roller means displaceable between extended and retracted positions relative to the support frame in response to displacement of said other of the motion detecting devices by the handle means.

15. The combination of claim 1, wherein one of the wheel engaging elements includes roller means displaceable between extended and retracted positions relative to the support frame in response to displacement of said other of the motion detecting devices by the handle means.

* * * * *